United States Patent [19]

Kishi

[11] Patent Number: 5,004,385
[45] Date of Patent: Apr. 2, 1991

[54] CHAMFERING MACHINE

[75] Inventor: Katsunobu Kishi, Tokyo, Japan

[73] Assignee: Nitto Kohki Co., Ltd., Tokyo, Japan

[21] Appl. No.: 482,499

[22] Filed: Feb. 21, 1990

[30] Foreign Application Priority Data

Feb. 27, 1989 [JP] Japan .............................. 1-21855[U]

[51] Int. Cl.$^5$ .............................................. B23C 5/14
[52] U.S. Cl. .................................. 409/180; 144/134 D
[58] Field of Search ............... 409/180, 181, 182, 175, 409/184, 138, 134; 144/134 R, 134 D, 134 A, 117 B

[56] References Cited

U.S. PATENT DOCUMENTS

| 726,516 | 4/1903 | Deaton | 144/134 D |
| 947,079 | 1/1910 | Latcham | 144/134 A X |
| 3,196,749 | 7/1965 | Zanni | 409/180 |
| 3,212,541 | 10/1965 | Burrows et al. | 144/134 |
| 3,289,716 | 12/1966 | Dutot | 144/134 D |
| 3,289,717 | 12/1960 | Dutot | 144/134 D |
| 3,360,023 | 12/1967 | Rutzebeck | 144/134 D |
| 3,733,663 | 5/1973 | Brucker | 144/134 D X |
| 4,669,923 | 6/1987 | McKinney | 144/134 D X |
| 4,787,786 | 11/1988 | Freud et al. | 409/180 |

FOREIGN PATENT DOCUMENTS 493237 3/1928 Fed. Rep. of Germany ...... 409/181

*Primary Examiner*—William Briggs
*Attorney, Agent, or Firm*—Nixon & Vanderhye

[57] ABSTRACT

A chamfering machine comprises a rotary shaft, a guide base provided perpendicularly to the rotary shaft, an adjusting unit for adjusting the relative positional relationship between the rotary shaft and the guide base, a cutter detachably mounted on the rotary shaft for chamfering the edge of a workpiece, a guide detachably mounted on the rotary shaft for contacting a lateral face of the workpiece and a fixing member for fixing the guide to the rotary shaft after the vertical positional relationship has been adjusted between the guide and the cutter.

7 Claims, 2 Drawing Sheets

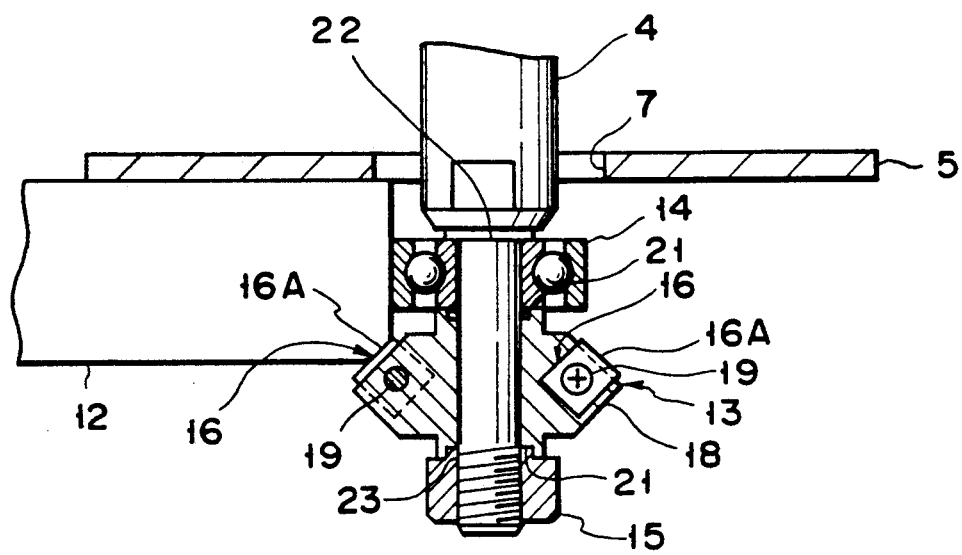
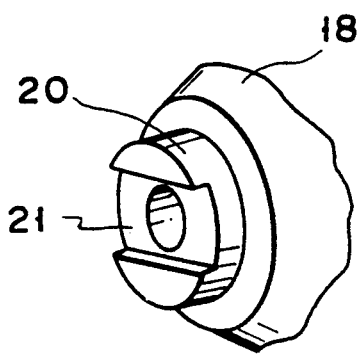
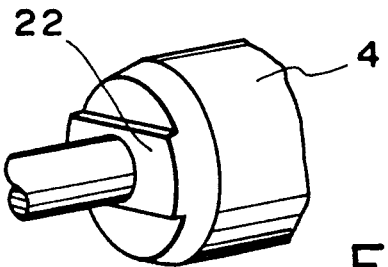
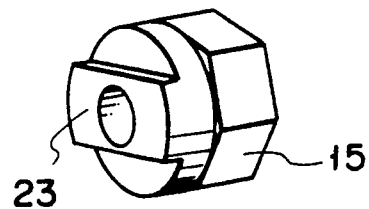

CHAMFERING MACHINE

BACKGROUND OF THE INVENTION

1. Field of the Invention

This invention relates to a portable chamfering machine for chamfering the edge portions of the undersurface of a workpiece efficiently.

2. Description of the Related Art

A conventional portable chamfering machine for chamfering the edge portion of a workpiece by means of the cutting edges formed on the outer periphery of a rotary cutter has a main body provided with a guide which comprises two guide faces intersecting with each other at right angles and are arranged such that the cutting edges of the rotary cutter are slantwise exposed at the intersecting portion thereof. The chamfering is carried out by moving the chamfering machine along the edge of the workpiece to be chamfered with the perpendicularly intersecting guide faces in contact with the both side faces of the edge of the workpiece.

When the edge of the undersurface of a workpiece is chamfered with this conventional machine, the workpiece must be turned upside down or the chamfering machine must be inverted to be applied to the underside edge of the workpiece to be chamfered. A conventional portable chamfering machine is proposed by this applicant in U.K. Patent application Ser. No. 8919027,6.

However, it takes time to turn the workpieces over every time their underside edges are to be chamfered. Particularly, it is not easy to upturn bulky workpieces each time. When the chamfering machine is used in a reverted manner, on the other hand, the operator must take an unnatural position and he cannot operate the machine easily. In either case, the operational efficiency is lowered.

SUMMARY OF THE INVENTION

The object of this invention is to provide a portable chamfering machine which chamfers the edge portions of not only the upper surface but the undersurface of a workpiece efficiently even if the workpiece is bulky.

In order to attain the object, a chamfering machine of this invention comprises a rotary shaft, a guide base provided perpendicularly to the rotary shaft, an adjusting unit for adjusting the relative positional relationship between the rotary shaft and the guide base, a cutter detachably mounted on the rotary shaft for chamfering the edge portion of a workpiece, a guide detachably mounted on the rotary shaft for contacting a lateral face of the workpiece and a fixing member for fixing the guide to the rotary shaft after the vertical positional relationship has been adjusted between the guide and the cutter.

When the edge portion of the upper surface of a workpiece is chamfered with the chamfering apparatus of this invention, the cutter is positioned to direct the cutting edges downward, and the cutter and the guide are fixedly mounted on the rotary shaft so as to locate the guide under the cutter. The rotary shaft is lifted or lowered with respect to the guide base such that the downward directed cutting edges bite into the edge portion of the upper surface of the workpiece by the predetermined amount. As the cutter is rotated, the chamfering machine is moved along the edge of the workpiece to be chamfered with the guide set in contact with the lateral sides of the workpiece.

When the edge portion of the undersurface of a workpiece is chamfered, the cutter is set to direct the cutting edges upward and the guide is positioned over the cutter. The rotary shaft is moved upward or downward with respect to the guide base so that the upward directed cutting edges bite into the edge of the undersurface of the workpiece by the predetermined amount. As the cutter is rotated, the chamfering machine is moved along the edge by contacting the guide with the lateral sides of the workpiece.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is a partially broken front view of the main part of the chamfering machine in which the positional relationship between the cutter and the guide bearing is reversed and which is set to chamfer the edge portion of the undersurface of a workpiece;

FIG. 3 is a perspective view of a part of the cutter holder having a recessed portion formed in its end portion;

FIG. 4 is a perspective view of a part of the rotary shaft having a projecting portion at its stepped portion; and FIG. 5 is a perspective view of the lock nut having a projecting portion on its end portion.

DETAILED DESCRIPTION OF THE PREFERRED EMBODIMENTS

Figure 1:
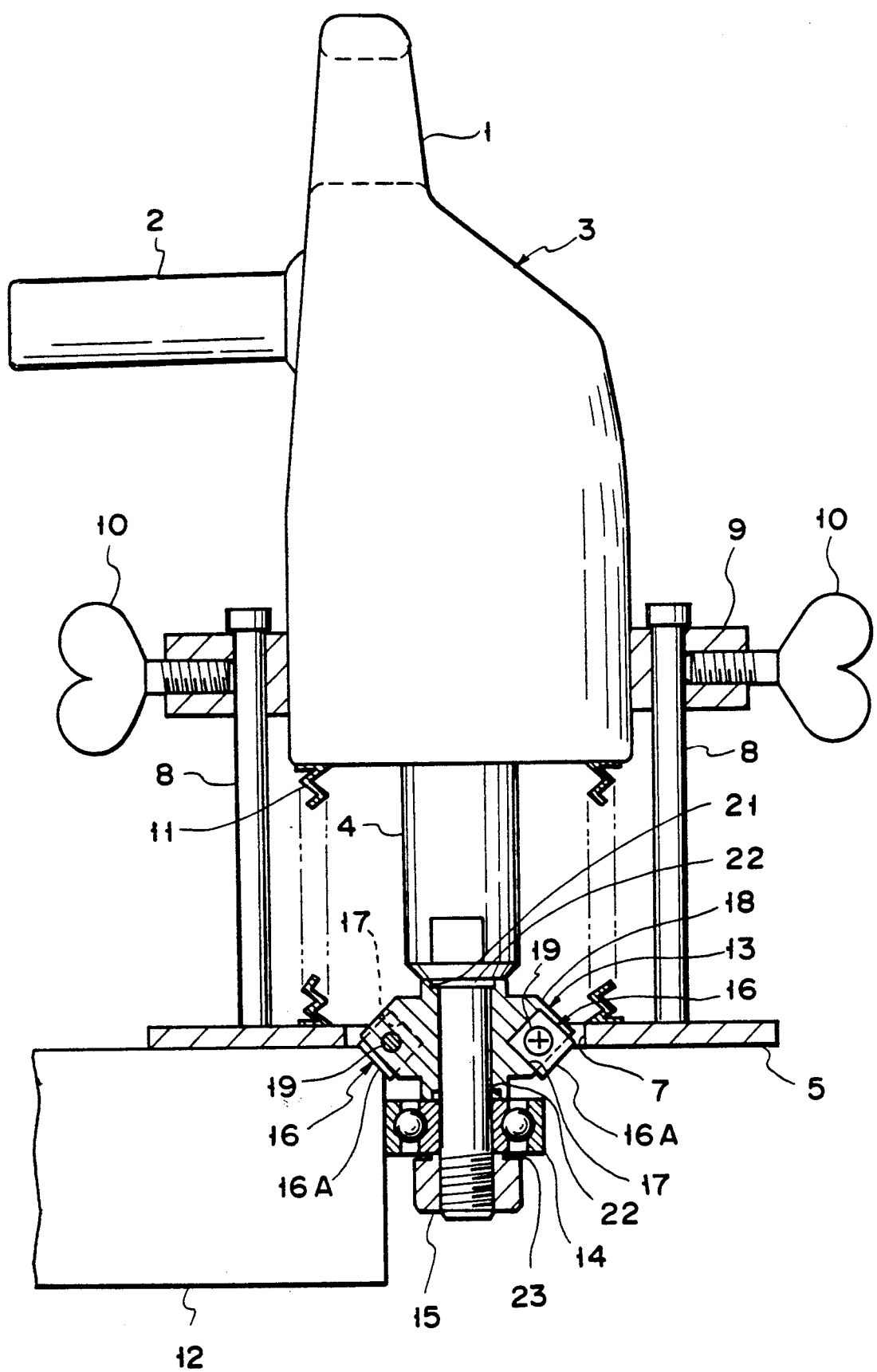
FIG. 1 is a partially broken front view of one embodiment of the chamfering machine of this invention which is set to chamfer the edge portion of the upper surface of a workpiece.

As shown in FIG. 1, an embodiment of the chamfering machine of this invention comprises a casing 3 provided on its upper end with a grip portion 1 and on its lateral side with an auxiliary handle 2, and also provided with a motor, not shown, housed in the casing 3 and driven by a fluid pressure or an electric power. The rotational force of the motor is transmitted directly or through a transmission, not shown, to a rotary shaft 4 downwardly extending from the casing 3.

A guide base 5 to be placed on the surface of a workpiece 6 is extended perpendicularly to the rotary shaft 4. Elevating guide posts 8 (four in number, for example) are perpendicularly mounted on the guide base 5 and arranged equidistantly in the circumferential direction with a through hole 7 formed in the guide base 5 as a center. The upper portions of the elevating guide posts 8 pass through an annular holder 9 fixed to the outer periphery of the casing 3 such that the casing 3 is lifted and lowered with respect to the guide base 5 to adjust the relative positional relationship between the rotary shaft 4 and the guide base 5 in the axial direction of the rotary shaft 4. The portions of the annular holder 9 through which the elevating guide posts 8 pass are thick and threadably engaged by thumbscrews 10 for tightening the elevating guide posts 8 to the annular holder 9. A bellows type cover 11 is disposed between the upper surface of the guide base 5 and the undersurface of the casing 3 so as to surround the rotary shaft 4.

The rotary shaft 4 downwardly extended from the casing 3 has a shoulder. On the front end portion of the rotary shaft 4 is fixedly mounted a cutter 13 for chamfering the edge portion of the workpiece 12 and is fitted a guide bearing or a guide 14 which rotates in contact with the lateral side portion of the workpiece 12. The cutter 13 and the guide bearing 14 can be turned upside down each other and are set in position on the rotary shaft 4 by means of a lock nut 15 in such a manner that they are sandwiched between the shoulder of the rotary shaft 4 and a lock nut 15 mounted on the tip end of the rotary shaft 4. The cutter 13 has square cutting tips 16 having cutting edges formed on their four side edges. The cutter 13 further has a holder 18 formed with fixing grooves 17 arranged in a mirror image relationship and receiving the cutting tips 16 so as to extend one cutting edge of each cutting tip 15 from the respective groove 17 at an inclining angle of 45 degrees with respect to the guide holder 18. The cutting tips 16 are fixed to the holder 18 by means of screws 19.

FIG. 1 shows the arrangement for chamfering the edge portion of the upper surface of the workpiece 12 with the cutter 13. The cutter 13 is set to direct downwards those cutting edges 16A of the cutting tips 16 which are extended from the holder 18, and the guide bearing 14 is disposed under the cutter 13. Thereafter, both the cutter 13 and the guide bearing 14 are tightened together by means of the lock nut 15.

On the contrary to FIG. 1, FIG. 2 shows the arrangement for chamfering the edge portion of the undersurface of the workpiece 12. The cutter 13 is set to direct upwardly those cutting edges 16 of the cutting tips 16 which are extended from the holder 18, and the guide bearing 14 is placed over the cutter 14. Then, the cutter 13 and the guide bearing 14 are fastened to each other by means of the lock nut 15.

A fixing structure of the cutter 13 and the guide bearing 14 to the rotary shaft 4 will now be explained.

In this embodiment, substantially rectangular recessed portions 21 are formed in the central parts of the upper and lower boss portions 20 (see FIG. 3). On the shoulder of the rotary shaft 4 is formed a substantially rectangular projecting portion 22 which can be fitted in the recessed portions 21 (see FIG. 4). On one end of the lock nut 15 is provided a substantially rectangular projecting portion 23 which can be inserted in the recessed portions 21 (see FIG. 5). When the cutter holder 18 is reversed, therefore, it can also be mounted on the rotary shaft 4. Further, the holder 18 and the guide bearing 14 are mounted on the rotary shaft 4 by sandwiching them between the projecting portion 22 on the shoulder of the rotary shaft 4 and the lock nut 15.

The operation of the above-mentioned embodiment will now be explained.

First, the chamfering of the edge portion of the upper surface of the workpiece 12 will be described.

As shown in FIG. 1, the cutter 13 is disposed to direct downwardly the cutting edge 16A of the cutting tips 16 which are held in the holder 18, and the guide bearing 14 is placed under the cutter 13. Then, the cutter 13 and the guide bearing 14 are mounted on the rotary shaft 4 and fixed thereto. Thereafter, the thumbscrews 10 are loosened, and the casing 3 is lifted or lowered until the downwardly directed cutting edges 16A are extended downward by a required chamfering amount from the undersurface of the guide base 5 in the through hole 7. After then, the thumbscrews 10 are tightened again to fix the casing 3 at the required level. In this state, the chamfering machine is held by an operator with his hands at the grip portion 1 and the auxiliary handle 2. By rotating the rotary shaft 4, the chamfering machine is mounted at the guide base 5 on the workpiece 12. As the chamfering machine is moved along the edge portion of the workpiece 12 with the guide bearing 14 in contact with the lateral side of the workpiece 12, the edge portion of the upper surface of the workpiece 12 is camfered by the cutting edges 16A of the cutter 13 rotating together with the rotary shaft 4.

Next, the chamfering of the undersurface of the workpiece 12 will be explained.

In this case, the chamfering machine is not turned upside down. Instead, as shown in FIG. 2, the cutter 13 is disposed to direct upwardly the cutting edges 16A of the cutting tips 16 which is held in the holder 18, and the guide bearing 14 is positioned above the cutter 13 by reversing the positions of the cutter 13 and the guide bearing 14. Then, the cutter 13 and the guide bearing 14 are fixedly mounted on the rotary shaft 4. In this state, the casing 3 is lowered until the upwardly directed cutting edges 16A contact the edge portion of the undersurface of the workpiece 12. After the amount of chamfering has been set to the predetermined one, the rotary shaft 4 is likewise rotated and the chamfering machine is placed at the guide base 5 on the workpiece 12. The edge portion of the undersurface of the workpiece 12 is chamfered by the cutting edges 16A of the cutter 13, as the chamfering machine is moved along the edge portion of the workpiece 12 with the guide bearing 14 in contact with the lateral side of the workpiece 12.

In place of lifting or lowering the casing 3 along the elevating guide posts 8 as in the case of the abovementioned embodiment, the guide base 5 may be fixed to the casing 3 when the rotary shaft 4 is made to be lifted and lowered with respect to the casing 3. The chamfering cutting edges are not limited to the cutting tips but may be the ones directly formed on the bulk shape cutter. Further, the structure for preventing the cutter and the guide bearing from freely rotating may comprise sliding keys formed on the rotary shaft and key grooves formed loosely fitted in the respective sliding keys and formed in the holes of the cutter and the guide bearing in which the rotary shaft is inserted.

This invention is not limited to the above-mentioned embodiments but various modifications are availably within the scope of this invention.

What is claimed is:

1. A chamfering machine comprising:
   a rotary shaft having a shoulder which includes a first projecting portion, and a threaded terminal end;
   a guide base oriented perpendicularly with respect to said rotary shaft;
   adjusting means for allowing adjustable movement between said rotary shaft and said guide base so as to achieve a selected relative positional relationship therebetween;
   a cutter detachably mounted on said rotary shaft, for chamfering an edge of a workpiece;
   a guide detachably mounted on said rotary shaft, for contacting a lateral face of said workpiece; and fixing means having a lock nut defining a second projecting portion threaded onto said terminal end of said rotary shaft, for positionally fixing said guide to said rotary shaft so as to maintain a selected vertical positional relationship between said guide and said cutter, wherein said cutter includes a holder and cutting tips fixed to said holder, said holder defining recessed portions at both ends thereof that are engageable with respective ones of said first and second projecting portions.

2. A chamfering machine comprising:

a rotary shaft having a terminal end;

a guide base for guiding movements of said chamfering machine relative to a workpiece;

a cutter assembly having a holder and cutter blades extending from said holder for chamfering edges of the workpiece, said cutter assembly being detachably associated with said rotary shaft so that said holder may be inverted between first and second positions to thereby in turn achieve first and second opposite orientations of said cutter blades relative to the workpiece edges;

adjustment means for allowing adjustable movements to occur between said rotary shaft and said guide base so as to obtain a selected positional relationship between said cutter blades and the workpiece edges, and for maintaining said selected positional relationship when obtained; and locking means for removably locking said cutter to said rotary shaft in one of said first and second positions thereof, wherein said locking means includes:

(a) a first projecting portion formed at said terminal end of said rotary shaft;

(b) a lock nut threaded onto said terminal end of said rotary shaft and having a second projecting portion;

(c) a recessed region defined in at least one end of said holder and configured to accommodate said first and second projecting portions; wherein (d) one of said first and second projecting portions is engaged with said at least one recessed region when said holder is respectively in one of said first and second positions.

3. A chamfering machine as in claim 2, which further comprises a guide element detachably mounted to said rotary shaft by means of said lock nut.

4. The chamfering machine according to claim 1, further comprising a casing for holding said rotary shaft.

5. The chamfering machine according to claim 4, wherein said adjusting means comprises:

elevating guide posts fixed to said guide base;

an annular holder fixed to said casing and provided slidably on said elevating guide posts; and thumbscrews screwed in said annular holder, for fixing said holder to said elevating guide posts.

6. The chamfering machine according to claim 5, further comprising a cover disposed between said casing and said guide base, for surrounding said rotary shaft.

7. A chamfering machine as in claim 3, wherein said holder defines recessed regions in both ends thereof each for accommodating one of said first and second projecting portions when said holder is in one of said first and second positions.

* * * * *